United States Patent [19]

Jones

[11] Patent Number: 4,599,099
[45] Date of Patent: * Jul. 8, 1986

[54] CYCLIC PROCESS OF FORMING GLASSWARE IN AN INDIVIDUAL SECTION GLASSWARE FORMING MACHINE

[75] Inventor: Stanley P. Jones, Tickhill, England

[73] Assignee: Emhart Industries, Inc., Farmington, Conn.

[*] Notice: The portion of the term of this patent subsequent to Apr. 17, 2001 has been disclaimed.

[21] Appl. No.: 433,124

[22] PCT Filed: Feb. 22, 1982

[86] PCT No.: PCT/GB82/00053
§ 371 Date: Sep. 30, 1982
§ 102(e) Date: Sep. 30, 1982

[87] PCT Pub. No.: WO82/02885
PCT Pub. Date: Sep. 2, 1982

[30] Foreign Application Priority Data

Feb. 27, 1981 [GB] United Kingdom ............... 8106180

[51] Int. Cl.⁴ .................. C03B 11/16; C03B 9/40
[52] U.S. Cl. ........................................ 65/29; 65/79; 65/DIG. 13
[58] Field of Search ............ 65/79, 29, 158, DIG. 13

[56] References Cited

U.S. PATENT DOCUMENTS

| | | | |
|---|---|---|---|
| 3,180,718 | 4/1965 | Wilhelm | 65/158 |
| 3,192,027 | 6/1965 | Wilhelm | 65/158 |
| 4,145,204 | 3/1979 | Farkas et al. | 65/164 |
| 4,247,317 | 1/1981 | Wood et al. | 65/29 |
| 4,255,177 | 3/1981 | Fenton | 65/79 |
| 4,266,961 | 5/1981 | Wood | 65/29 |
| 4,364,764 | 12/1982 | Farkas et al. | 65/29 |
| 4,443,241 | 4/1984 | Jones | 65/158 |

FOREIGN PATENT DOCUMENTS

| | | |
|---|---|---|
| 2422603 | 4/1979 | France. |
| 1599801 | 4/1978 | United Kingdom. |
| 1599802 | 4/1978 | United Kingdom. |
| 1599803 | 4/1983 | United Kingdom. |
| WO82/02878 | 9/1982 | PCT Int'l Appl. ............ 65/29 |

Primary Examiner—Kenneth M. Schor
Attorney, Agent, or Firm—Arthur B. Moore

[57] ABSTRACT

In a cyclic process of forming glassware in an individual section glassware forming machine, the formation of parisons in the shaping of articles of glassware during each cycle of the process is monitored and information derived from said monitoring is utilized to permit continued operation of the cyclic process in the absence of any undesired condition indicated by the monitoring and to inhibit either further parison-forming actions at the blank station (A) of the machine in consequence of the recognition of an undesired condition relating to parison formation or further article-shaping actions at the shaping station (C) in consequence of the recognition of an undesired condition relating to the shaping of the articles of glassware.

4 Claims, 7 Drawing Figures

CYCLIC PROCESS OF FORMING GLASSWARE IN AN INDIVIDUAL SECTION GLASSWARE FORMING MACHINE

TECHNICAL FIELD

This invention is concerned with a cyclic process of forming glassware in an individual section glassware forming machine, which machine has three stations spaced apart longitudinally of the machine, comprising the steps of forming a parison from a gob of molten glass in a blank mould at a blank station, transferring the parison from the blank station to an intermediate reheating station in which reheating of the parison takes place, transferring the reheated parison from the intermediate station to a shaping station, shaping an article of glassware from the reheated parison in a blow mould at the shaping station, and transferring the article of glassware from the shaping station to a take-out position.

The invention is also concerned with an individual section glassware forming machine which comprises three operating stations spaced apart longitudinally of the machine which are, respectively, a blank station including a blank mould for forming a parison, an intermediate station in which reheating of a parison takes place, and a shaping station including a blow mould for finally shaping an article of glassware, and independently operable first, second and third transfer means, the first transfer means being operable to transfer a parison from the blank station to the intermediate station, the second transfer means being operable to recieve a parison from the first transfer means, support the parison at the intermediate station and transfer the parison from the intermediate station to the shaping station, and the third transfer means being operable to transfer an article of glassware from the shaping station to a takeout position.

BACKGROUND ART

In the manufacture of glassware in a conventional individual section machine, a gob of molten glass is first formed into a parison in a blank mould at a blank station and the parison is transferred directly from the blank station to a shaping station where the parison is shaped into an article of glassware. During the manufacture of glassware in such a machine, an operator observes the glassware being produced and, when he notices any interruption to the production of glassware, he takes action to affect an emergency stop of the machine. During such an emergency stop, the feeding of further gobs of molten glass to the blank station is prevented and the machine is completely stopped. However, if the operator is not immediately aware of an interruption to production, the machine will continue to operate with further gobs being fed to it. Glass thus accumulates within the machine. While the glass is hot it can damage the operating parts of the machine by causing them to become excessively hot and, when the glass cools and hardens, damage can be done to the machine as the operating parts attempt to operate against the hard glass.

Whether the operator is immediately aware of an interruption to production or not, the conventional individual section machine must be brought to a complete halt for remedial action to be undertaken. When the manufacture of glassware is recommenced in that type of machine, there is a considerable delay before commercial articles of glassware are again produced because of the time necessary to bring the moulding equipment at both stations to the appropriate operating temperatures for production of glassware.

It has been proposed (see U.K. Patent Specification No. 1,491,859) to provide a modified form of the individual section glassware forming machine having three stations. A blank station at which a parison is formed, an intermediate reheating station where reheating of the parison takes place, and a shaping station at which shaping of the article of glassware from the parison takes place.

DISCLOSURE OF INVENTION

In accordance with the present invention, the applicants propose a process of forming glassware in an individual section glassware forming machine which comprises monitoring the formation of parisons and the shaping of articles of glassware during each cycle of the process, and utilising information derived from said monitoring to permit continued operation of the cyclic process in the absence of any undesired condition indicated by the monitoring and to inhibit either further parisonforming action at the blank station in consequence of the recognition of an undesired condition relating to parison formation or further article-shaping action at the shaping station in consequence of the recognition of an undesired condition relating to the shaping of articles of glassware.

By the use of the present invention, therefore, advantage is taken of the presence of the intermediate station in a three station individual section glassware forming machine to enable the two stages of manufacturing an article of glassware to be performed separately, and for one stage of the process to be stopped while there is continued operation of the other stage of the process. This is particularly important in the event of a fault developing in connection with the shaping of the articles of glassware from parisons which have been correctly formed. In such a case, the process of the present invention enables parison-forming at the blank station to be continued and those parisons to be transferred to the intermediate station where they are dropped from the machine has cullet, which is returned to a glass melting furnace for re-use. Most importantly, the continued formation of parisons at the blank station keeps all the moulding equipment at the blank station at the correct operating temperature so that manufacture of commercial articles of glassware can be resumed with the minimum of delay once remedial action has been undertaken to correct the fault in the article-shaping stage of the process.

The monitoring may comprise producing a signal representative of the position of a part of one of the moulds at a time when a mould should be closed, and checking that the signal does not differ by more than a predetermined amount from a signal respresentative of the desired closed position of the mould part. This enables it to be detected when a mould does not close correctly. The signal representative of the desired closed position of the mould part can be an average of a selected number of immediately preceding positions of the mould part when the mould part should be closed, account thereby being taken of where on the mould part altering the closed position of the mould part gradually as the machine operates.

The monitoring may comprise checking that a desired number of parisons is present at the intermediate station at a time when parisons should be reheating at the intermediate station prior to transfer to the shaping station. This enables a parison which has remained in the blank mould at the blank station to be detected.

The monitoring may comprise counting the articles of glassware transferred from the shaping station to the take-out position and comparing the count obtained with the number of articles of glassware intended to be shaped simultaneously at the shaping station during each cycle of the process. This enables an article of glassware which has remained in the mould at the shaping station to be detected.

The monitoring may comprise checking that none of the reheated parisons at the intermediate station has a length exceeding a predetermined length prior to transfer of the parisons from the intermediate station to the shaping station. This enables parisons which are malformed to the extent that they are of excessive length to be detected.

In consequence of the recognition of an undesired condition relating to parison formation, further parison-forming actions may be inhibited by prevention of the delivery of further gobs of molten glass to the blank station, and, in consequence of the recognition of an undesired condition relating to the shaping of articles of glassware, further articles-shaping actions at the shaping station may be inhibited by the dropping of the parisons at the intermediate station.

An individual section glassware forming machine in accordance with the invention comprises monitoring means for monitoring the formation of parisons and the shaping of articles of glassware, and inhibiting means responsive to the monitoring means for inhibiting the formation of further parisons at the blank station in the event of the monitoring means indicating an undesired condition relevant to parison formation, and for inhibiting the shaping of further articles of glassware in the event of the monitoring means indicating an undesired condition relevant to the shaping of articles of glassware.

BRIEF DESCRIPTION OF DRAWINGS

In the accompanying drawings:

FIG. 1 is a diagrammatic plan view of a machine in accordance with the invention, parts of which have been omitted for clarity;

BEST MODE OF CARRYING OUT THE INVENTION

Figure 1:
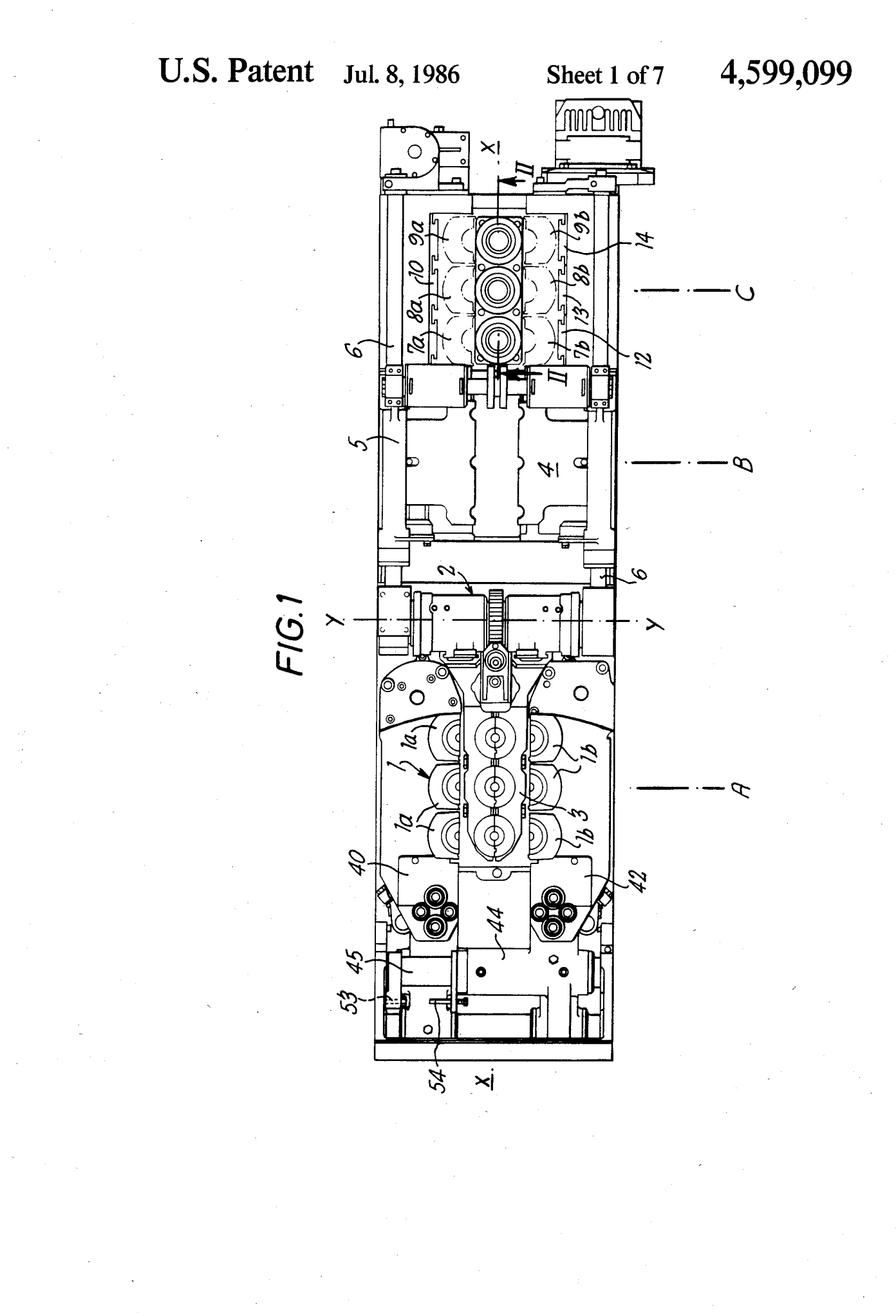
Figure 2:
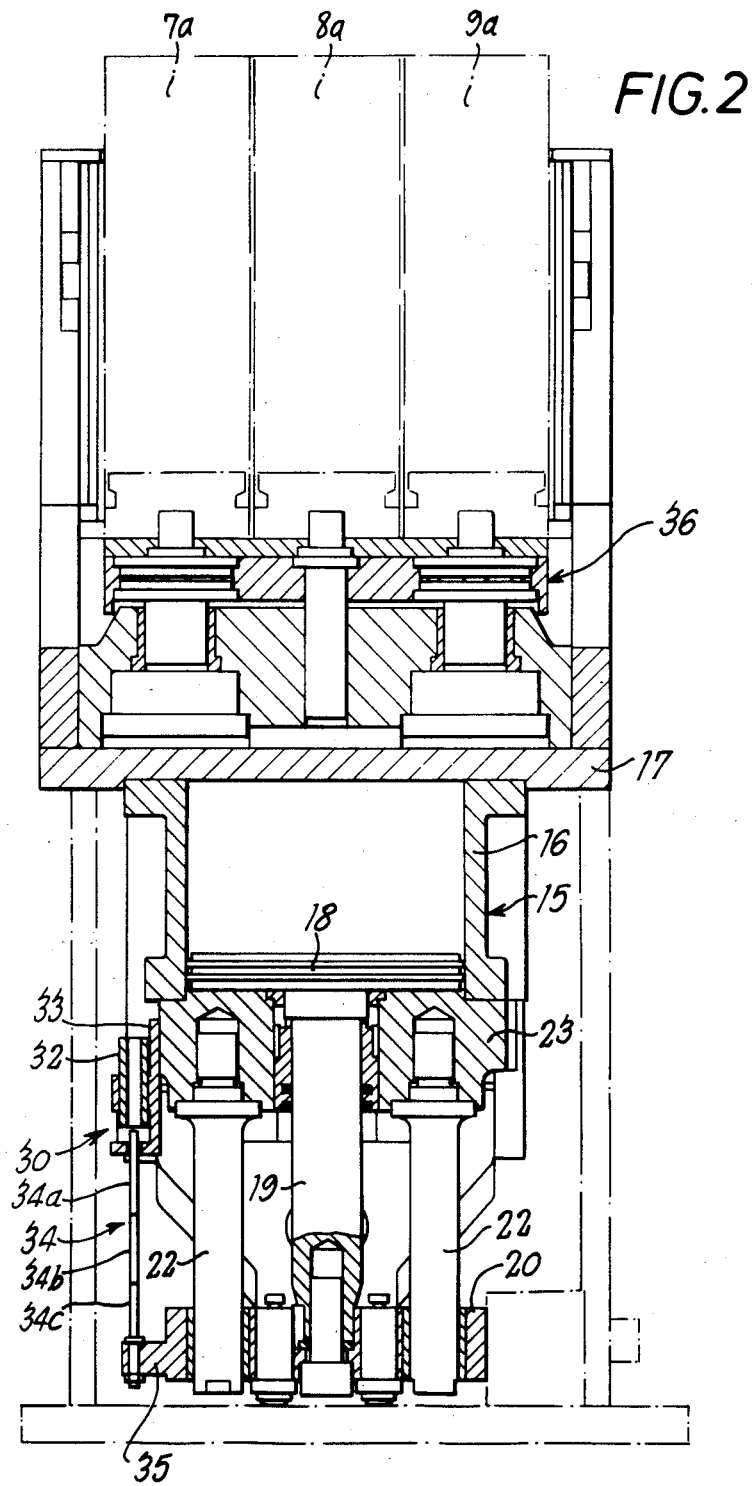
FIG. 2 is an enlarged fragmentary sectional view, taken on the line II—II in FIG. 1.

The glassware forming machine shown in FIG. 1 is a triple gob three station individual section machine. Gobs of molten glass are fed to three blank moulds 1 (shown open in FIG. 1) at a blank station A where the gobs are formed into parisons in an inverted position. A transfer and invert mechanism 2 moves the three parisons formed at the blank station A to an intermediate reheating station B. The moulds 1 have mould halves 1a and 1b. The mechanism 2 is rotatable about a transverse horizontal axis y—y, a neck ring arm 3 of the mechanism 2 swinging through 180° to transfer the parisons from the station A to the station B in a conventional manner. At the intermediate station B, the parisons are received in an upright position by support jaws 4 of a transfer carriage 5 horizontally movable along spaced guide rails 6 between the intermediate station and a shaping station C. The parisons are formed into articles of glassware at the shaping station C, being removed from the shaping station C by take-out means (not shown in FIG. 1 but indicated at 68 in FIG. 4).

In FIG. 1, the three blow moulds at the shaping station C are shown in the open position. Each blow mould includes two blow mould halves 7a, 7b; 8a, 8b; 9a, 9b which come together on the central longitudinal axis x—x of the machine when the blow moulds close. The three blow mould halves 7a, 8a, 9a are carried by a common mould carrier 10 whereas the three blow mould halves 7b, 8b, 9b are carried by individual mould carriers 12, 13, and 14.

The blow moulds are opened and closed by a pneumatic piston and cylinder device 15, (FIG. 2), the cylinder 16 of which is attached to the inside of a fixed member 17 forming part of the frame of the machine, and a piston 18 of which is attached to a downwardly extending piston rod 19. The lower end of the piston rod 19 is attached to a crosshead 20 which is guided for vertical movement by vertical guides 22 depending from a block 23 secured to the underside of the cylinder 16.

As the piston 18 moves up and down in the cylinder 16 to affect opening and closing movement of the blow moulds at the shaping station C, movement of the crosshead 20 with respect to the block 23, and therefore movement of the blow mould half, is sensed by means of a position sensing device in the form of a linear variable differential transformer 30. The transformer 30 includes a body 32 (secured by a bracket 33 to the block 23) and a core 34 which is attached to a lateral extension 35 of the crosshead 20 and is therefore movable in a vertical direction. The core 34 comprises an intermediate section 34b of a ferromagnetic material located between two sections 34a and 34c of non-ferromagnetic material. When the blow moulds are fully closed the ferromagnetic section 34b of the core 34 is wholly within the body 32 of transformer 30 which produces electrical signals indicative of the closed position of the blow mould half.

Figure 3:
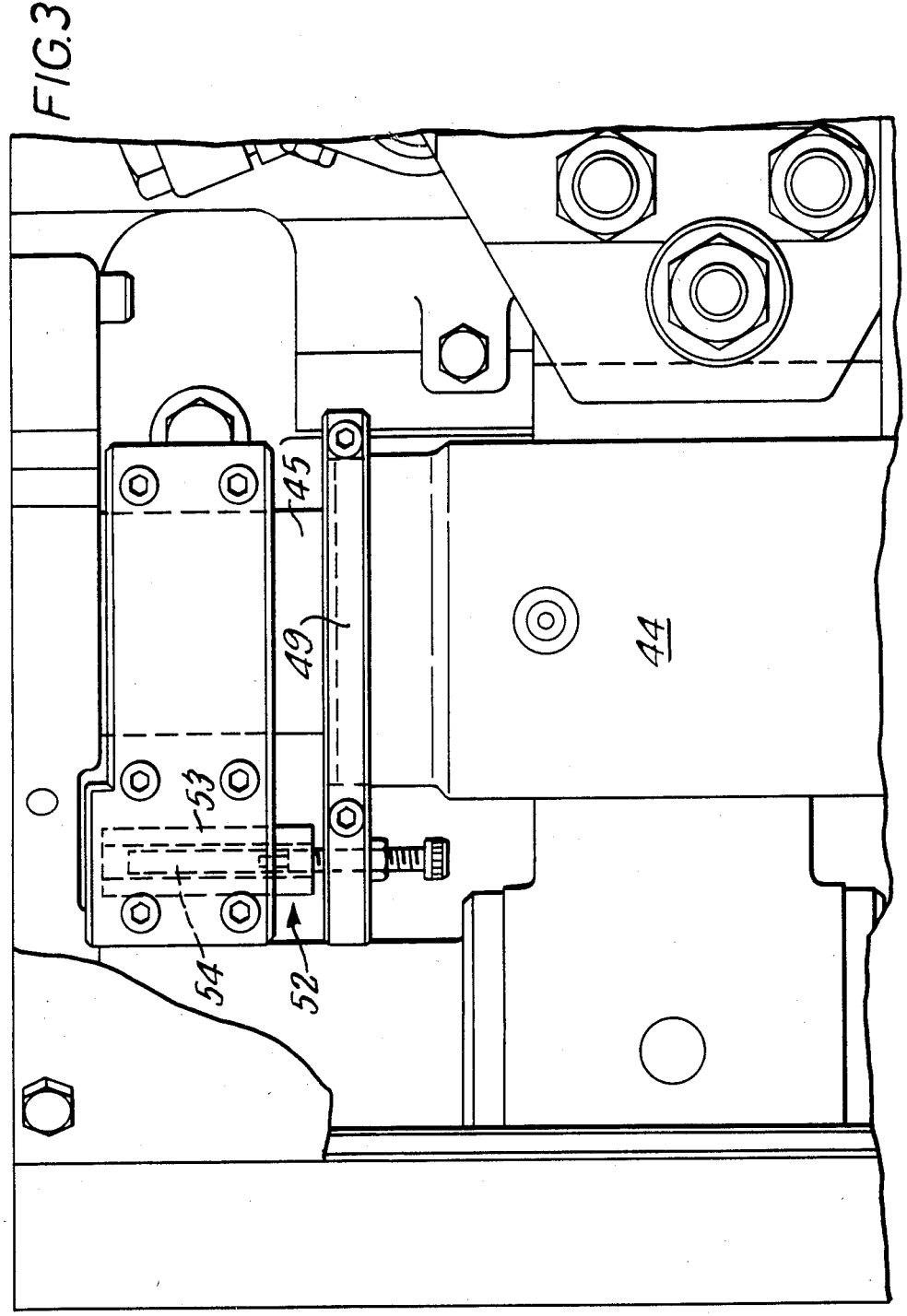
FIG. 3 is an enlarged plan view of a left hand end of FIG. 1.

The electrical signal from the transformer 30 is sampled under the control of an electronic timing system to monitor the closed position of the blow mould half and to energise an emergency action device in the event of the transformer signal departing from a desired value by more than a desired amount. Thus, the transformer 30 produces a signal representative of the position of a part of one of the moulds at a time when the mould should be closed, and it is checked that the signal does not differ by more than a predetermined amount from a signal representative of the desired closed position of the mould part. As the desired closed position of the mould parts may vary with temperature or with wear, the signal from the transformer 30 is compared with a signal which is an average of a selected number (for example 10) of immediately preceding positions of the mould part when the mould part should be closed. The closing or the blank moulds at the station A are monitored in similar fashion to the closing of the blow moulds at the station C. In this connection, FIG. 3 shows a sliding member 44 which is movable (under the action of a piston and cylinder device which is not shown) along a guide rod 45 which spans the station A transversely, i.e. at right angles to the longitudinal axis x—x as shown in FIG. 1. Transverse movement of the sliding member 44 is sensed by a linear variable differential transformer 52 similar to the transformer 30 and used in similar manner to provide a signal indicative of the closed position of the blank mould half 1b. Departure of this signal by more than a predetermined amount from a desired value, (for example an average of the immediately preceding ten similar signals) when sampled under control of the electronic timing system, which may be a computer, causes energisation of an emergency action device. The reference numeral 49 indicates a bracket on which the movable core 54 of the transformer 52 is mounted and the reference numeral 53 indicates the coil of the transformer 52.

Figure 4:
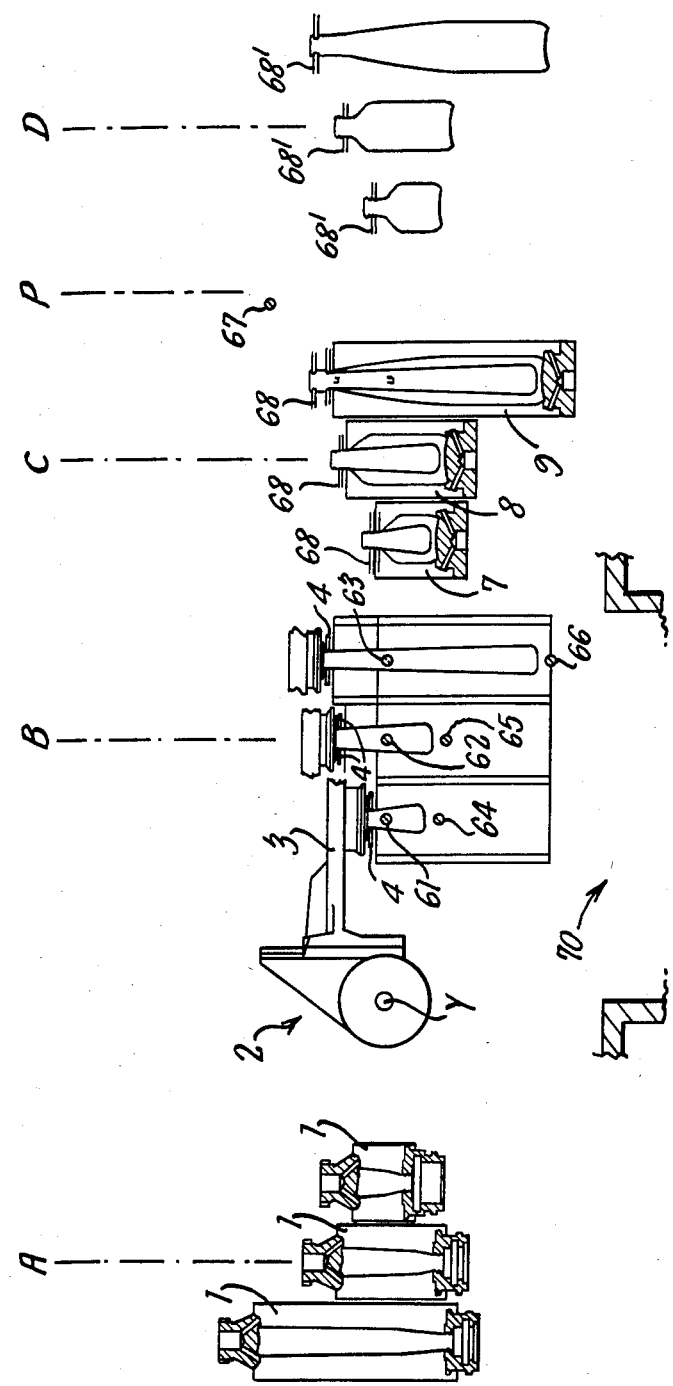
FIG. 4 is schematic side view of the machine of FIG. 1 showing examples of different sizes of glassware which may be made in the machine and indicating, by way of example, positions at which optical heads of monitoring means of the machine may be located.

FIG. 4 shows schematically parisons or articles of glassware of three different sizes at the different stations of the machine (the three different sizes of the parisons or articles of glassware is to indicate different operating arrangements for the machine). Also in FIG. 4, there are shown diagrammatically the positions of optical heads of infra-red radiation detecting devices which constitute part of the monitoring means for the formation of parisons and the shaping of articles of glassware. These optical heads are designated in FIG. 4 by the reference numerals 61, 62, 63, 64, 65, 66 and 67. The optical heads 61, 62, 63 are located at the intermediate station B for detecting infra-red radiation emitted by a parison delivered to the station B by the transfer and invert mechanism 2, and then supported at the station B by the support jaws 4 on the transfer carriage 5 of the second transfer means. Accordingly, the optical heads 61, 62, 63 are all located in fixed positions at the station B such that they will always receive radiation emitted by a parison at the station B irrespective of the size or shape of the parison.

Infra-red radiation received by the optical heads 61, 62, 63 is utilised to energise an emergency action device in the event that any one of the optical heads 61, 62 and 63 does not receive infra-red radiation at a time when a parison should be supported within the field of view of the optical head at station B.

Each of the optical heads 64, 65 and 66 is positioned at the station B at a level just beneath that to which a reheating parison should stretch at station B immediately before the operation of the transfer carriage 5 to move the parisons from the station B to the shaping station C. Accordingly, the vertical position of each of the optical heads 64, 65 and 66 is adjustable, and each of these optical heads is shown in a different position selected for the particular size of parison with which it is being used. In general, the optical head 64, 65, and 66 will all be at the same level in the operation of the machine to manufacture simultaneously three similar articles of glassware.

The receipt of infra-red radiation by any one of the optical heads 64, 65 and 66 is utilised to energise an emergency action device which will indicate that at least one of the parisons has stretched to an excessive length at the station B, and that the transfer of such a parison from the station B to the blow mould at the station C is likely to cause a malformation of an article of glassware.

FIG. 4 also shows, at the station C and at a take-out position D, alternative positions 68 and 68' for the tongs of a take-out mechanism which forms a third transfer means of the machine and operates about an axis in a plane P—P to move articles of glassware in an arcuate path from station C to the take-out position D. The seventh optical head 67 is positioned near this axis such that each of the articles of glassware formed in the three blow moulds at the station C will be moved through the field of view of the optical head 67 as the articles of glassware are moved from the blow station C to the take-out position D by the take-out mechanism. The infra-red radiation received by the optical head 67 is utilised to produce electrical signals which are fed to a counter to produce a count corresponding to the number of articles of glassware transferred from the station C to the take-out position D. Under control of the electronic timing system, such as a computer, the count of articles of glassware passing through the field of view of the optical head 67 is compared with the expected number of articles of glassware (in this case 3) in each cycle of operation of the machine and an emergency action device is energised if the count in the counter differs from the expected number.

One example of a method by which the detection of a fault in the operation of the machine may be utilised to inhibit a part of the operation will now be described with reference to FIGS. 5, 6 and 7. In the 12. description which follows the terms primary cycle and secondary cycle will be used to indicate, respectively, the group of machine functions involved in forming a parison from a gob of molten glass at station A and for the group of machine functions used for shaping an article of glassware in a blow mould at the station C. However, the primary cycle additionally comprises the operation of the transfer and invert mechanism 2, the movement of the transfer carriage 5 from the station C to the station B, and the closing of the support jaws 4 to be ready to receive a parison from the transfer and invert mechanism 2. The movement of the transfer carriage 5 from the station B to the station C and the opening of the support jaws at the station C are linked to, or form part of, the secondary cycle as does also the operation of the third transfer or take-out mechanism for transferring articles of glassware from the station C to the take-out position D.

Figure 5:
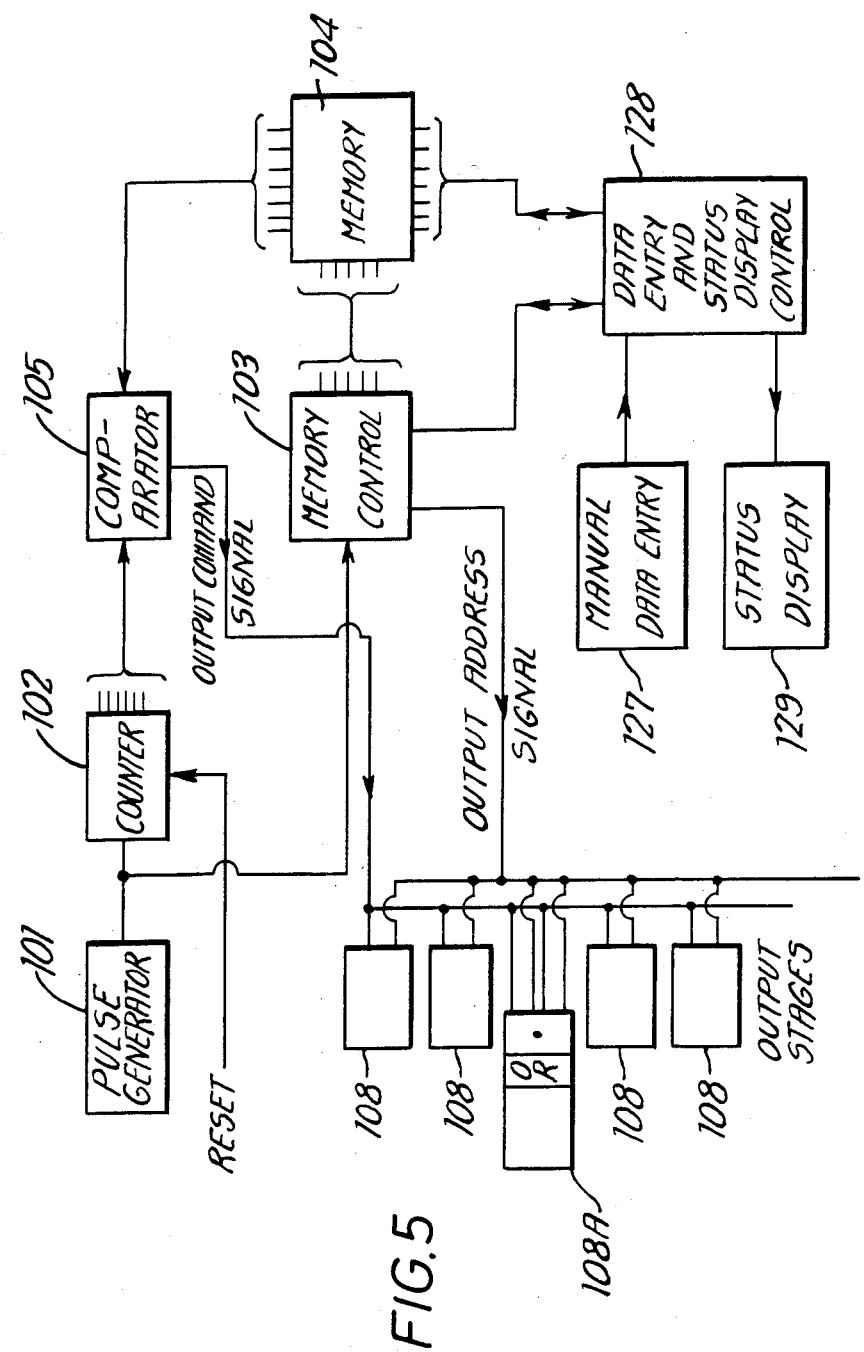
FIG. 5 is a block diagram of one example of a system for operating the machine of FIGS. 1 to 4.

FIG. 5 shows diagrammatically an operating circuit for controlling the various events or machine functions in a glassware forming machine in accordance with the invention. FIG. 6 is supplementary to FIG. 5 and shows the manner in which a signal from an emergency action device may be used to feed events inhibiting signals into a memory control of FIG. 5. The logic sequence performed by the circuit of FIG. 5 is shown in FIG. 7.

Referring to FIG. 5, pulses from a pulse generator 101 are fed to a counter 102 and to a memory control 103. On receipt of each pulse the counter 102 advances one step on a count from 0 to 1023, the same pulse triggers the memory control 103 to initiate a scan of all the information concerning the events of the glassware forming cycle which are stored in a memory 104. The memory 104 may, for example, be a ferrite core store, and the memory control 103 controls the scan of the memory and the feeding of information representing event ON and OFF counts to a comparator 105 in which the ON and OFF counts are compared with the count in the counter, and an appropriate output command signal is given from the comparator 105.

Figure 6:
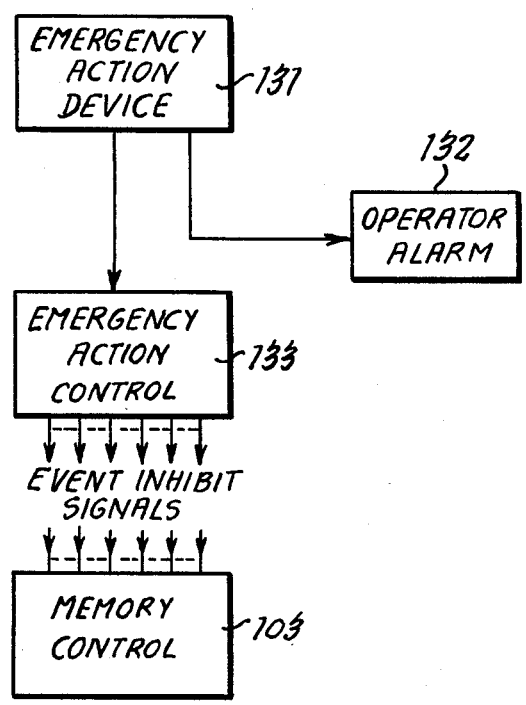
FIG. 6 is a block diagram of a part of a system to be used in conjunction with the system of FIG. 5 for operating the machine.

Referring now to FIG. 6, an emergency action device 131 produces two outputs, one of which goes to an operator alarm 132, which may be a warning light, and the other of which operates an emergency action control 133. The emergency action control 133 is designed to produce event inhibit signals which will inhibit those machine functions which are desired to be discontinued immediately upon the recognition of the detection of a particular fault.

In the case of an incorrect closed position of a blank mould half 1b, it is desired immediately to discontinue parison forming at station A. It is therefore essential for an emergency action control 133 associated with an emergency action device 131 energised on the detection of an incorrect blank mould part closed position to prevent the feeding of further gobs of molten glass to the blank moulds at the station A, and it is also desired to prevent further closing of the blank moulds in order to eliminate damage to the blank moulds. Event inhibiting signals for at least these machine functions will therefore be produced by emergency action control 133, but the emergency action control 133 could be designed to produce event inhibiting signals for all the machine functions which are part of the primary cycle, or alternatively a selected combination of those machine functions.

Similar event inhibiting signals will be produced by an emergency action control 133 which is operated in response to an emergency action device 131 energised when at least one of the optical heads 61, 62 and 63 at station B fails to receive infra-red radiation at a time when parisons should be present at station B.

In both the above cases, the machine functions on the secondary cycle, including the functions for article-shaping at the station C, may continue to be performed, with a possible exception of cooling of the blow moulds because these will no longer be receiving heat from parisons during actual article-shaping.

When emergency action device 131 is a device energised in consequence of the receipt of infra-red radiation by any one of the optical heads 64, 65 and 66, the associated emergency action control 133 is designed to produce event inhibit signals to inhibit the formation of further articles of glassware at the station C. This can be done by simply inhibiting a mechanical function which causes parisons to be transferred from the station B to the station C, for example either by inhibiting the event which is the movement of the transfer carriage 5 from the station B to the station C, or by inhibiting all event ON ("jaws close") signals for support jaws 4 on the primary cycle (in other words the secondary cycle is effective to open the support jaws 4 at station B before movement of the transfer carriage 5 from the station B to the station C). In consequence, parisons formed at station A will be transferred by the transfer and invert mechanism 2 to the station B, released at the station B, momentarily supported by the support jaws 4 at the station B under control of the primary cycle event ON signals for support jaws 4, and then released to fall through a cullet chute 70 (FIG. 4) at station B.

The remaining operations of the secondary cycle may be continued with a possible exception of the supply of cooling air to the blow moulds at the station C, so that the extraction of heat from these blow moulds 7, 8 and 9 is reduced and less time is required to return the blow moulds to the correct operating temperature on recommencement of the article-shaping at the shaping station C.

On the other hand, if an emergency action device 131 associated with either the blow mould part closed position monitoring, or the article counting by the optical head 67 is energised, then it is desired to stop operations at the shaping station C, and the event inhibit signals produced by the associated emergency action control 133 could be event inhibit signals for the majority, if not all, of the events on the secondary cycle.

Although the emergency action control 133 has been illustrated in FIG. 6 as separate from the memory control 103, the production of event inhibit signals consequent upon the energisation of a respective one of the emergency action devices could form part of the memory control 103.

Figure 7:
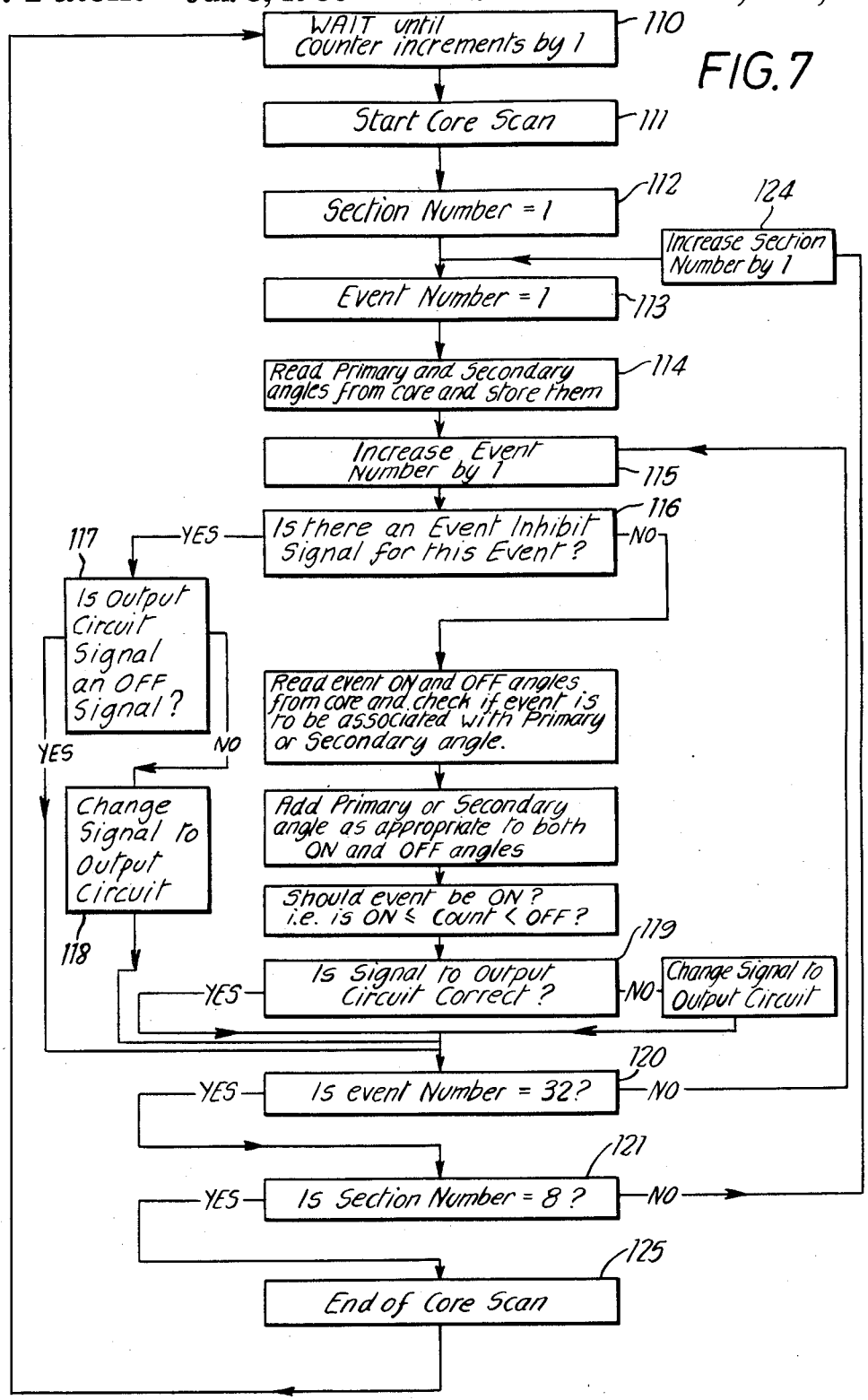
FIG. 7 is a logic sequence diagram showing the steps performed in carrying out the process in accordance with the invention using the machine shown in FIGS. 1 to 4.

The logic sequence with which the memory control 103 controls the memory 104 to feed information to the comparator 105 and produce output command signals is illustrated in the logic sequence diagram of FIG. 7.

In FIG. 7, the receipt of a pulse from the pulse generator to advance the counter 102 to the next count figure, e.g. from 0920 to 0921, has the effect of activating the memory control 103 from the waiting condition in which it was waiting as indicated at 110 in FIG. 7, and initiates a core scan sequence as represented by box 111 in FIG. 7. At the start of the core scan, the memory control 103 moves to the next step and interrogates the memory 104 by specifying that the section number shall equal 1 as indicated by the box 112 and then that the event number shall equal 1 as specified by the box 113.

Stored in electronic event No. 1 of the memory 104 for each individual section of a glassware forming machine are primary and secondary angles for the respective section. The primary and secondary angles are counts which may be chosen independently of one another but the values of which determine the relationship of the group of events of machine functions which comprise the primary cycle to the group of events or machine functions which comprise the secondary cycle. The actual count at which a machine function or event in, for example, the primary cycle takes place is determined by adding a count representative of the event ON and OFF angles to the count representative of the primary angle.

Once the memory control 103 has selected section No. 1 and event No. 1, its next action, as shown by box 114, is to read the primary and secondary angles from the memory 104 and store them. Since no event is controlled directly by the primary and secondary angles, there is no further logic function to be performed for event No. 1 and the next step in the logic sequence, as indicated by box 115, is to increase the event number by one.

The next action for the momory control 103 is to ask whether there is an event inhibit signal for this event in the machine section which is then being controlled (box 116). If the answer to this question is NO, the memory control 103 continues with a sequence of events. If the answer to the question of box 116 is YES, the memory control 103 then asks whether the output circuit signal for this event is an OFF signal (box 117), and if the answer to this question is NO, takes action to change the signal to the output circuit for this event (box 118). The memory control 103 then proceeds to ask the question of box 120 and proceed to the next events for the same section, or alternatively proceed to the scan of the events of the next section.

On the other hand, if the question of box 117 is answered YES, the memory control 103 proceeds directly to the question of box 120.

The machine shown in the drawings provides that a fault in the production of glassware is immediately detected and action is taken automatically to stop further parison-forming or article-shaping, as the case may be, at that station of the machine at which the fault has been detected, while allowing operating actions to continue at the other station of the machine, if so desired.

It will be appreciated that the present invention is not limited to the use of infra-red detection means for detecting the presence of parisons at the intermediate station, for checking the length of parisons at that station, and for counting the number of articles of glassware transferred from the intermediate station to the shaping station. Other known detection means, for example a light beam and a photo-electric cell, may be employed as alternatives for these monitoring means and for alternative monitoring actions such as counting the number of parisons transferred from the blow station to the intermediate station or detecting the presence of articles of glassware at the take-out position. If the parison transfer count were employed, detection of a fault would be used to inhibit further parison-forming actions at the blank station, while an article detection at the take-out position would be used to inhibit further article-shaping actions at the shaping station in the event of a fault being found.

I claim:

1. An improved cyclic process for forming glassware in an individual section glassware forming machine, in which each machine section has three stations spaced apart longitudinally, including the steps of forming a parison from a gob of molten glass in a blank mold at a blank station; transferring the parison from the blank station to an intermediate reheating station in which reheating of the parison takes place; transferring the reheated parison from the intermediate station to a shaping station; shaping an article of glassware from the reheated parison in a blow mold at the shaping station; and transferring the article of glassware from the shaping station to a takeout position; wherein the improvement comprises the steps of:

monitoring the formation of parisons at said blank station to derive a blank station condition signal representative of the position of a part of said blank mold at a time when said blank mold should be closed;

comparing said blank station condition signal with a predetermined blank standard representative of a desired closed position of the blank mold part, and inhibiting further parison formation if and only if said blank station condition signal falls outside said predetermined blank standard;

monitoring the shaping of articles at said shaping station to derive a shaping station condition signal representative of the position of a part of said blow mold at a time when said blow mold should be closed; and comparing said shaping station condition signal with a predetermined shaping standard representative of a desired closed position of said blow mold part, and inhibiting further shaping of articles if and only if said shaping station condition signal falls outside said predetermined shaping standard, wherein the predetermined blank standard and the predetermined shaping standard are each averages of a selected number of immediately preceding positions of the respective mold part when the respective mold should be closed.

2. A process according to claim 1, further comprising the steps of monitoring the intermediate station to count the number of parisons present at a time of the glassware forming cycle when parisons should be reheated, and comparing this count with a predetermined parison count.

3. A process according to claim 1, further comprising the steps of counting the articles of glassware transferred from the shaping station to the takeout position and comparing the count obtained with a predetermined count of the number of articles to be shaped simultaneously during each cycle of the process.

4. A process according to claim 1, further comprising the step of measuring the length of reheated parisons at the intermediate station, and comparing this length with a predetermined length.

* * * * *